US012442928B2

(12) United States Patent
Porebski et al.

(10) Patent No.: US 12,442,928 B2
(45) Date of Patent: Oct. 14, 2025

(54) SYSTEM AND METHOD FOR MAPPING A VEHICLE ENVIRONMENT

(71) Applicant: Aptiv Technologies AG, Schaffhausen (CH)

(72) Inventors: Jakub Porebski, Cracow (PL); Krzysztof Kogut, Cracow (PL); Maciej Rózewicz, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 636 days.

(21) Appl. No.: 17/644,046

(22) Filed: Dec. 13, 2021

(65) Prior Publication Data

US 2022/0187469 A1 Jun. 16, 2022

(30) Foreign Application Priority Data

Dec. 14, 2020 (EP) .................................... 20213858

(51) Int. Cl.
*G01S 17/931* (2020.01)
*G01S 17/86* (2020.01)
*G01S 17/894* (2020.01)
*G06V 10/84* (2022.01)
*G06V 20/58* (2022.01)

(52) U.S. Cl.
CPC ............ *G01S 17/931* (2020.01); *G01S 17/86* (2020.01); *G01S 17/894* (2020.01); *G06V 10/84* (2022.01); *G06V 20/58* (2022.01)

(58) Field of Classification Search
CPC ...... G01S 17/931; G01S 17/86; G01S 17/894; G06V 20/58; G06V 10/84

USPC ......................................................... 701/519
See application file for complete search history.

(56) References Cited

U.S. PATENT DOCUMENTS

| 10,192,008 B2 | 1/2019 | Tanzmeister |
| 10,552,979 B2 | 2/2020 | Zhu et al. |
| 10,553,117 B1* | 2/2020 | Johnson ............ B60W 30/0956 |
| 10,867,191 B2 | 12/2020 | Steyer et al. |
| 10,914,813 B2* | 2/2021 | Dang .................... G01S 13/931 |

(Continued)

FOREIGN PATENT DOCUMENTS

DE 102013217486 3/2015

OTHER PUBLICATIONS

Danescu, Modeling and Tracking the Driving Environment with a Particle-Based Occupancy Grid, IEEE Transactions on Intelligent Transportation Systems, vol. 12, No. 4, Dec. 2011 (Year: 2011).*

(Continued)

*Primary Examiner* — Seth A Silverman
(74) *Attorney, Agent, or Firm* — Harness, Dickey & Pierce, P.L.C.

(57) ABSTRACT

Provided is a computer-implemented method for mapping a vehicle environment, the method comprising: a) defining a first grid in the earth frame of reference having a first coordinate system; b) initializing a position of the vehicle in the first grid and a first set of cell occupancy values of the first grid; c) receiving sensor data of the surroundings of the vehicle from one or more sensors on the vehicle; d) updating the first grid with a second set of occupancy values calculated at least in part from the sensor data; and e) calculating one or more absolute velocities of one or more objects in the earth frame of reference from the change in cell occupancy values of the first grid.

20 Claims, 9 Drawing Sheets

(56) References Cited

U.S. PATENT DOCUMENTS

| | | | |
|---|---|---|---|
| 11,814,039 B2* | 11/2023 | Yershov | G05D 1/0274 |
| 11,823,461 B1* | 11/2023 | Song | G01S 13/931 |
| 2009/0028440 A1* | 1/2009 | Elangovan | H04N 5/272 |
| | | | 382/103 |
| 2012/0053755 A1* | 3/2012 | Takagi | G01S 7/4808 |
| | | | 701/1 |
| 2019/0047439 A1 | 2/2019 | Natroshvili et al. | |
| 2020/0020239 A1* | 1/2020 | Chen | G08G 5/25 |
| 2020/0183003 A1* | 6/2020 | Lee | B60W 30/09 |
| 2020/0233434 A1* | 7/2020 | Chiappetta | G01C 21/206 |
| 2020/0298703 A1* | 9/2020 | Max | B60K 35/00 |
| 2021/0056712 A1* | 2/2021 | Daudelin | G06V 20/58 |
| 2021/0101624 A1* | 4/2021 | Philbin | G06F 18/251 |
| 2021/0110193 A1* | 4/2021 | Green | G06V 40/20 |
| 2021/0237761 A1* | 8/2021 | Das | G06T 7/248 |
| 2021/0253103 A1* | 8/2021 | Kumar | B60W 60/001 |
| 2021/0323572 A1* | 10/2021 | He | G06T 3/14 |
| 2021/0334556 A1* | 10/2021 | Vignard | G06V 20/58 |
| 2021/0354725 A1* | 11/2021 | King | B60W 30/10 |
| 2021/0380106 A1* | 12/2021 | Chinni | G05D 1/0238 |

OTHER PUBLICATIONS

"Extended European Search Report", EP Application No. 20213858.2, Jun. 1, 2021, 9 pages.

Andriamahefa, "Integer Occupancy Grids: a probabilistic multi-sensor fusion framework for embedded perception", Feb. 2017, 184 pages.

Song, et al., "2D LiDAR Map Prediction via Estimating Motion Flow with GRU", Feb. 19, 2019, 7 pages.

* cited by examiner

SYSTEM AND METHOD FOR MAPPING A VEHICLE ENVIRONMENT

CROSS-REFERENCE TO RELATED APPLICATION

This application claims priority to European Patent Application Number 20213858.2, filed Dec. 14, 2020, the disclosure of which is hereby incorporated by reference in its entirety herein.

BACKGROUND

Manually operated vehicles such as cars are typically provided with one or more sensors to sense and map the environment around the vehicle to assist the driver in safe operation of the vehicle. For example, the vehicle may be provided with a sensor system which is configured to detect static and moving objects in the vehicle's surroundings. In order to properly track objects in the surroundings, the velocity of objects should be calculated relative to earth's frame of reference rather than the vehicle's frame of reference, in order to determine which objects are static (and therefore form part of the static environment through which the vehicle moves) and dynamic (and therefore also moving through the static environment).

Sensor data from the vehicle is obtained in the vehicle's frame of reference and may be used to generate an occupancy grid describing the location of objects in the vehicle's surroundings. As the vehicle may generally be moving relative to the earth, both static and dynamic objects may have a relative velocity in the sensor data.

Existing algorithms for determining absolute object velocities from the vehicle's sensor data (i.e. from the vehicle frame of reference) tend to be computationally complex in order to analyze the relative velocities of the objects to differentiate between static and dynamic objects. Simple motion detection algorithms which measure the change in the occupancy between two time-instances are not usable because motion is detected for any object which appears to move in the vehicle frame of reference, including static objects.

Accordingly, there is a need to provide a reliable method of measuring the absolute velocity of objects in the vehicle's surroundings which is less computationally complex.

SUMMARY

The present disclosure relates to a method for mapping a vehicle environment, in particular for generating a velocity map of absolute object velocities in the vehicle environment, and a computer program product and object tracking system for performing the same method.

According to a first aspect, there is provided a computer-implemented method for mapping a vehicle environment, the method comprising: a) defining a first grid in the earth frame of reference having a first coordinate system; b) initializing a position of the vehicle in the first grid and a first set of cell occupancy values of the first grid; c) receiving sensor data of the surroundings of the vehicle from one or more sensors on the vehicle; d) updating the first grid with a second set of occupancy values calculated at least in part from the sensor data; and e) calculating one or more absolute velocities of one or more objects in the earth frame of reference from the change in cell occupancy values of the first grid.

The method may further comprises transforming the position coordinates of the one or more absolute velocities to a vehicle frame of reference, and optionally the one or more absolute velocities in the vehicle frame of reference may be displayed on a display device of the vehicle.

The one or more absolute velocities may be generated using an optical flow algorithm.

Steps c) to e) may be repeated iteratively.

The one or more absolute velocities may be calculated for one or more objects in a velocity map grid containing the vehicle and following the position of the vehicle, and a border defining the velocity map grid may be at least a predetermined distance from a border defining the first grid.

When the vehicle moves to a position at or within a predetermined distance to the border of the first grid, the first grid may be repositioned in the earth frame of reference such that the vehicle is more than the predetermined distance from the border defining the first grid.

The cells of the repositioned first grid may be initialized with occupancy values of the overlapping cells in the prior position of the first grid.

The borders of the velocity map grid may be parallel to the borders of the first grid.

The second set of occupancy values may be calculated at least in part from the first set of occupancy values, and optionally the second set of occupancy values may be calculated from a fusion of the first set occupancy values and a third set of occupancy values calculated from the received sensor data. The fusion may optionally be a Bayesian fusion.

The method may comprise classifying an object as dynamic if the absolute velocity of the object is more than a predetermined threshold value, and otherwise classifying the object as static.

According to a second aspect, there is provided a computer program comprising computer-readable instructions which, when executed by a processor, cause the process to execute a method according to the first aspect.

According to a third aspect, there is provided an object tracking system for a vehicle configured to perform the method according to the first aspect.

BRIEF DESCRIPTION OF THE DRAWINGS

Embodiments will now be explained in detail, by way of non-limiting example only, with reference to the accompanying figures described below.

DETAILED DESCRIPTION

Figure 1A:
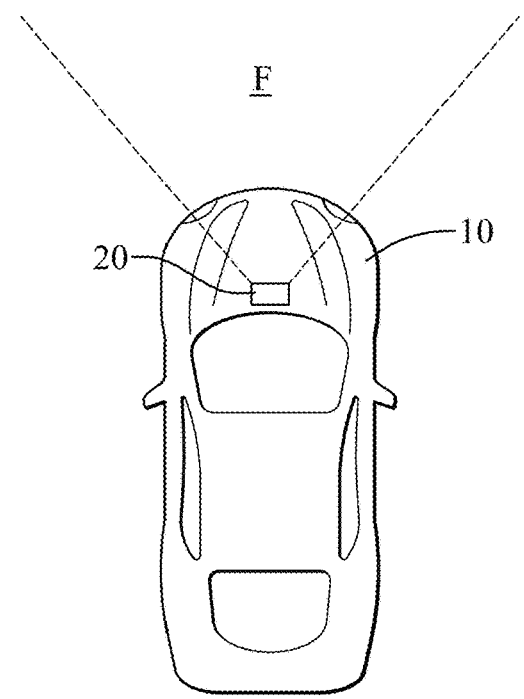
FIG. 1A shows a schematic diagram of a vehicle equipped with a device for mapping the environment of the vehicle.

FIG. 1A shows a vehicle 10 equipped with a device 20 for mapping the environment of the vehicle 10 according to one or more embodiments of the present disclosure. The device 20 may have various components mounted on the vehicle 10 at different locations, but for the sake of simplicity the device 20 is depicted as a single component mounted on the vehicle. The device 20 includes one or more sensors for sensing objects and/or free space in the surroundings of the vehicle 10. For example, the device 20 includes one or more radar sensors, lidar sensors, ultrasonic sensors and/or imaging sensors for detecting objects in the surroundings of the vehicle 10. The device 20 is an object tracking system which is configured to map the environment of the vehicle 10 according to the methods disclosed herein.

In the device 20, the sensors are mounted on the vehicle 10 such that they are able to sense objects within a field of view F of the vehicle surroundings, and in particular to sense the distance to objects in a plurality of directions from the vehicle 10 in the field of view. For example, sensors may be mounted at the front corners of the vehicle 10. The field of view is depicted as extending in the frontward direction of the vehicle 10, although the field of view could extend in any direction of the vehicle. Further, the field of view could be a partial view of the vehicle's 10 surroundings, or it could be an entire panoramic view of the surroundings. It will be appreciated that the number, position, and orientation of the sensors of the device 20 can be selected to achieve the desired field of view.

Figure 1B:
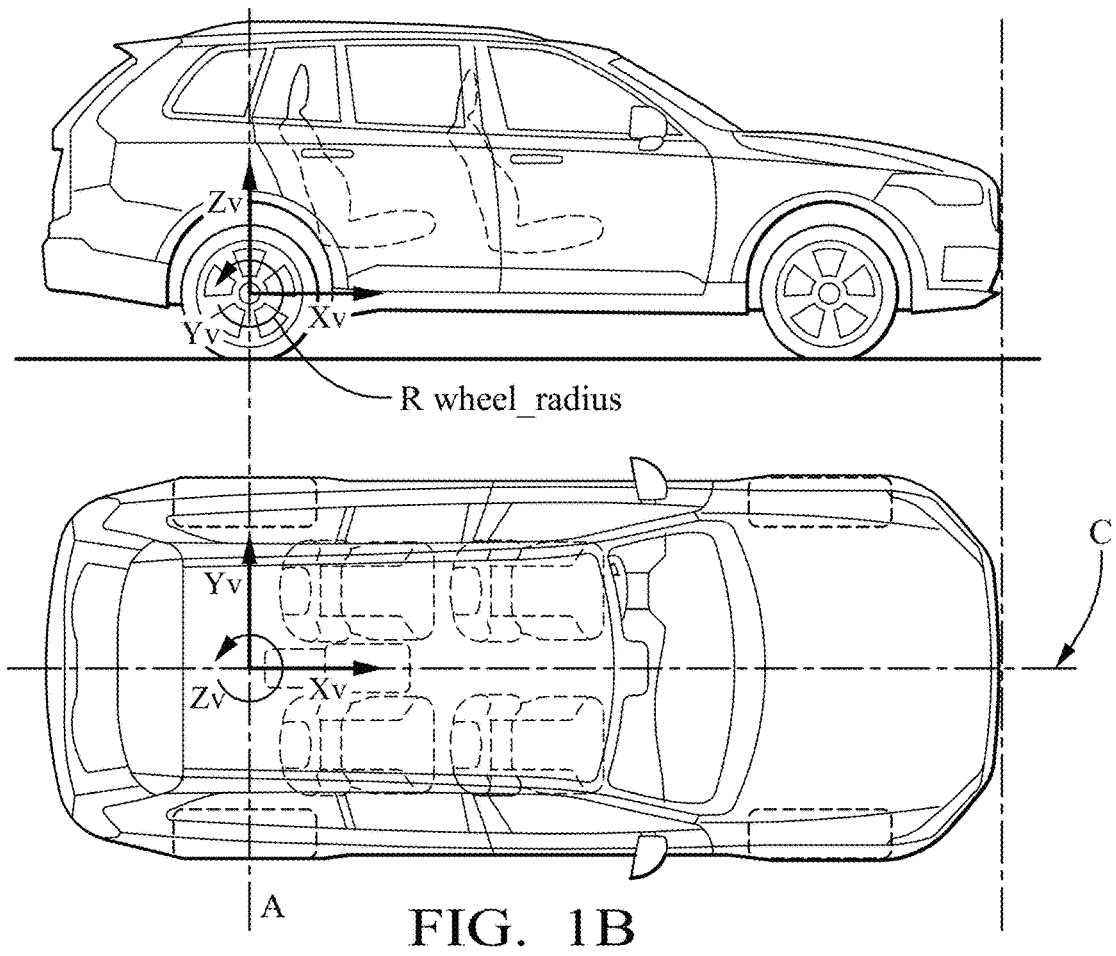
FIG. 1B shows a schematic diagram of a vehicle coordinate system.

FIG. 1B shows a side and plan view of the vehicle coordinate system (VCS) of the vehicle 10, although it will be appreciated that other vehicle coordinate systems may be selected without departing from the scope of the disclosure. In the illustrated embodiment, the VCS may be a right-handed axis system, being centered on the center of the rear axle for the vehicle 10 in a normal, stationary state. The x-axis of the VCS aligns with the vehicle sprung weight centerline C, and the y-axis aligns with the axis of the rear-wheel axle A.

Figure 2:
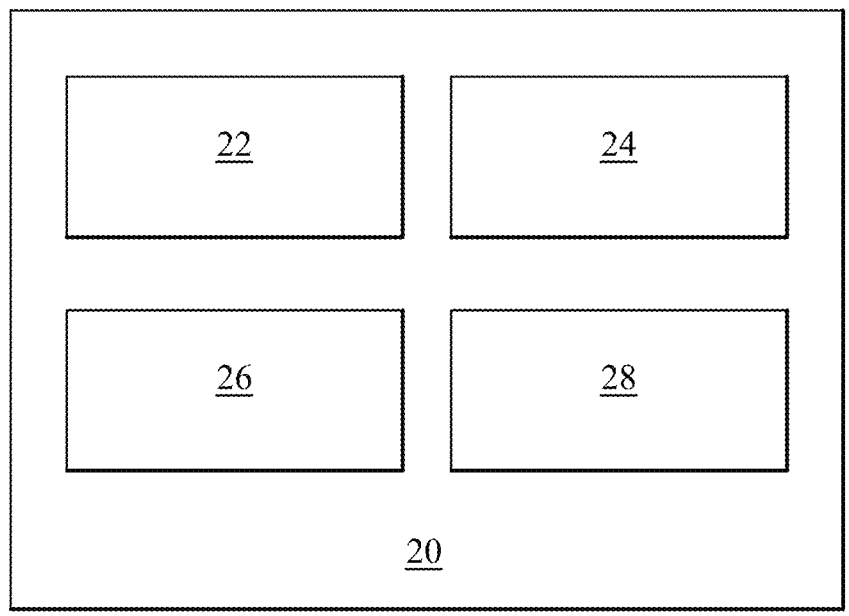
FIG. 2 shows a schematic diagram of a device for mapping the environment of a vehicle.

FIG. 2 shows a schematic block diagram of a device 20 for mapping the environment of the vehicle 10 according to one or more embodiments. The device 20 includes one or more sensors 22, an acquisition unit 24, an occupancy mapping unit 26 and a determining unit 28.

The one or more sensors may be a radar sensor including one or more radar antennas configured to emit radar signals, for example modulated radar signals, e.g. a Chirp-Signal. A signal may be acquired or detected at the one or more antennas 110 and is generally referred to as a return signal. The return signal(s) may result from a reflection of the emitted radar signal(s) on an obstacle. The one or more antennas may be provided individually or as an array of antennas, wherein at least one antenna of the one or more antennas emits the radar signal(s), and at least one antenna of the one or more antennas detects the return signal(s). The detected or acquired return signal(s) represents a variation of an amplitude/energy of an electromagnetic field over time.

Alternatively or additionally, the one or more sensors may include one or more lidar or ultrasonic sensors, which are similarly configured to emit signals to the surroundings of the vehicle and to detect reflected signals from the surroundings of the vehicle and therefore detect objects in the surroundings. The one or more sensors may alternatively or additionally include a stereo camera, from which distance to an object within the field of view of the stereo camera can be determined via a stereo algorithm.

The acquisitioning unit 24 is configured to acquire sensor data (e.g. range and range rate data) from the one or more sensors and compute the location of one or more objects in the vehicle's surroundings from the sensor data. In particular, for embodiments including a radar, lidar or ultrasound sensor, the acquisitioning unit 24 may acquire the return signal (e.g. detected at the one or more antennas) and may apply an analogue-to-digital (A/D) conversion thereto. The acquisitioning unit 24 may convert a delay between emitting the signal(s) and detecting the return signal(s) into range data indicating the distance between an object and the vehicle 10, and the direction of the object is also calculated from the return signal(s) (e.g. from comparing multiple signals from different antennas). The delay, and thereby the range data, may be acquired by correlating the return signal (s) with the emitted radar signal(s). Alternatively, or additionally the acquisitioning unit 24 may acquire image data from one or more stereo cameras and perform a stereo algorithm on the image data to calculate the distance to an object and the vehicle 10. The position of the sensors on the vehicle 10 may be calibrated in the VCS and the acquisitioning unit 24 may be configured to convert the range data to position coordinates in the VCS. If multiple different sensor types are used having overlapping fields of view, then the data may be combined (e.g. by averaging the detected range values for each sensor or similar) to determine the position of an object in a given direction.

It is noted that the vehicle may be any vehicle such as a lorry, a truck, a farming vehicle, a motorbike, a train, a bus, an aircraft, a drone, a boat, a ship or the like.

The occupancy mapping unit 26 is configured to acquire the coordinates of the detected objects or free space calculated by the acquisitioning unit 24, and to calculate an occupancy grid in the earth frame of reference based on the data. More specifically, the occupancy mapping unit 26 includes a sensor model which takes the acquired detection data from the acquisitioning unit 24 as an input and generates an occupancy grid from the data (it will be appreciated that any sensor model may be used—for example any physical model, deterministic model or inverse sensor model). For example, the occupancy mapping unit 26 may receive a plurality of detections from the acquisitioning unit, each detection including a range value and an azimuth (indicating the distance and direction of the detected object or free space with respect to the vehicle). The detections may then be converted into a set of occupancy probabilities for cells in an occupancy grid.

Figure 3:
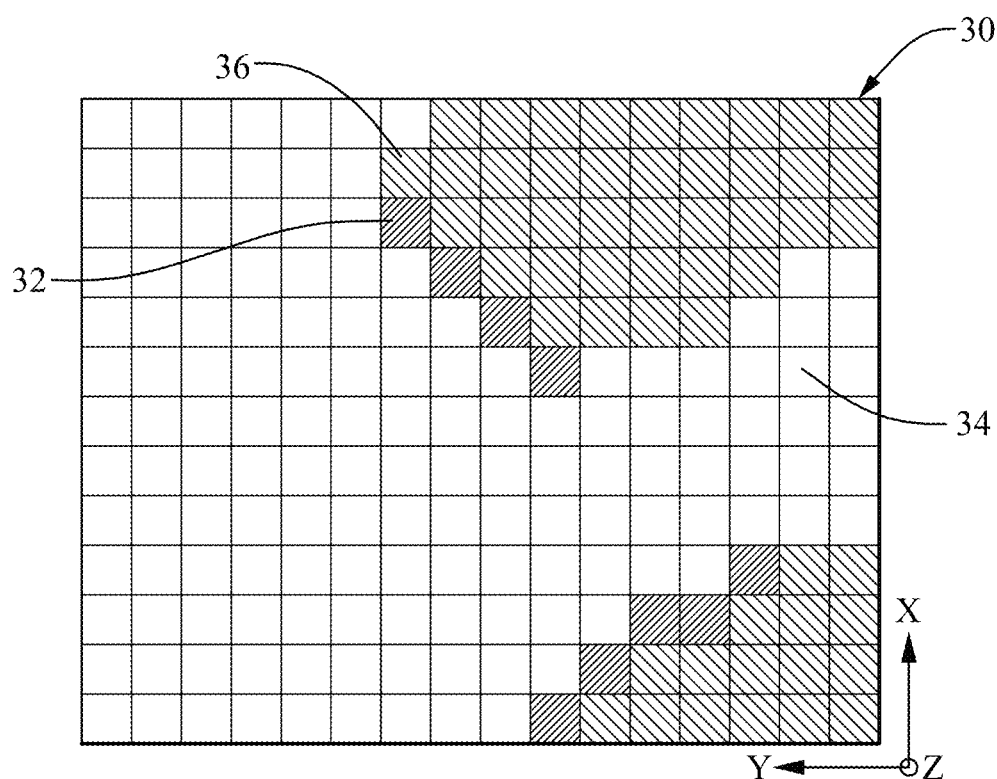
FIG. 3 shows a schematic diagram of an occupancy grid.

An exemplary occupancy grid is shown in FIG. 3. The occupancy grid includes a grid of cells. The cell positions are defined using an occupancy grid coordinate system. The coordinate system may be a right-handed coordinate system, the origin being attached, for example at a corner of the grid. The coordinates of the bottom right cell is (0,0,0) with the coordinates of each neighboring cell increasing by one in the direction of movement from the first cell. For example, cell 34 has the coordinates (7,1) or (7,1,0) (the z value need not be included for a two-dimensional grid). The z-axis is defined in 2D applications to correctly define the direction of rotation but may also be used to define the positions of cells in a 3D grid for 3D applications. The occupancy grid may be defined in an earth frame of reference, a vehicle frame of reference or another frame of reference. For example, the occupancy grid may be generated in the vehicle frame of reference, and as such the coordinates of the occupancy grid each correspond to a fixed coordinate in the vehicle frame of reference. Each cell may take an occupancy value indicating whether that position is occupied by an object or not. For example, in the illustrated example, the black cells 32 indicate that the cell is occupied by an object (and corresponds to the position where the sensors detect an object). On the other hand, the white cells 34 indicate that the cell is not occupied by an object. Finally, the grey cells 36 indicate that there is no knowledge of the occupancy of that cell (for instance because another object lies in between that cell and the sensors, such that no signal reaches the position corresponding to that cell. The occupancy value for each cell is calculated from the detections of the acquisitioning unit 24. For example, based on the range, azimuth and uncertainties of the detections, the occupancy evidence for each cell is calculated, which describes the probability that each cell is the origin of a detection (i.e. contains the location of the detection). The occupancy grid may be a Bayesian occupancy grid wherein the probability of the cell occupancy is calculated from evidence values obtained from the object and/or free space detections, although any type of occupancy grid may be used without departing from the present disclosure. For example, the occupancy probability of a cell may be given by $p(occ)=0.5+0.5 \cdot p(c|d)$, where $p(c|d)$ is the occupancy evidence value of cell c given an object detection d. Equally, the free space probability may be given by $p(free)=0.5+0.5 \cdot p(c|f)$, where $p(c|f)$ is the free space evidence value of cell c given a free space detection f. In some embodiments, the occupancy grid may include a grid of probabilities that each cell is occupied based on the P(occ) values and/or P(free) values. Each cell may then be assigned a probability value that the cell is occupied based on the object and/or free space detections. The occupancy grid may be rendered as, for example, a greyscale image or similar based on the probability value (0 being white/black, 1 being black/white), and as described in further detail below, a motion detection algorithm may be performed on the grayscale occupancy grid between time frames to detect object velocities. Each cell may instead be assigned as "occupied" if the occupancy probability is above an upper threshold, or "empty" if the occupancy probability is below a lower threshold. The occupancy grid may be rendered in two colors accordingly and a motion detection algorithm may be performed on the occupancy grid between time frames to detect object velocities. In some embodiments each grid cell may only be assigned "empty" or "occupied". In other embodiments a cell may further be assigned as "unknown" if the occupancy probability is between the upper and lower threshold when the thresholds differ. It will be appreciated that other methods may be used to generate the occupancy grid from the detection data. For example, a Dempster-Shafer framework may instead be used to generate the occupancy grid. Any suitable motion detection algorithm may be performed on the occupancy grid generated under any framework by measuring the change in the occupancy values of the occupancy grid between time frames.

Finally, the device 20 includes a determining unit 28 for determining absolute object velocities in the earth frame of reference based on the occupancy grid data, by performing a motion detection algorithm on the occupancy grid.

Figure 4:
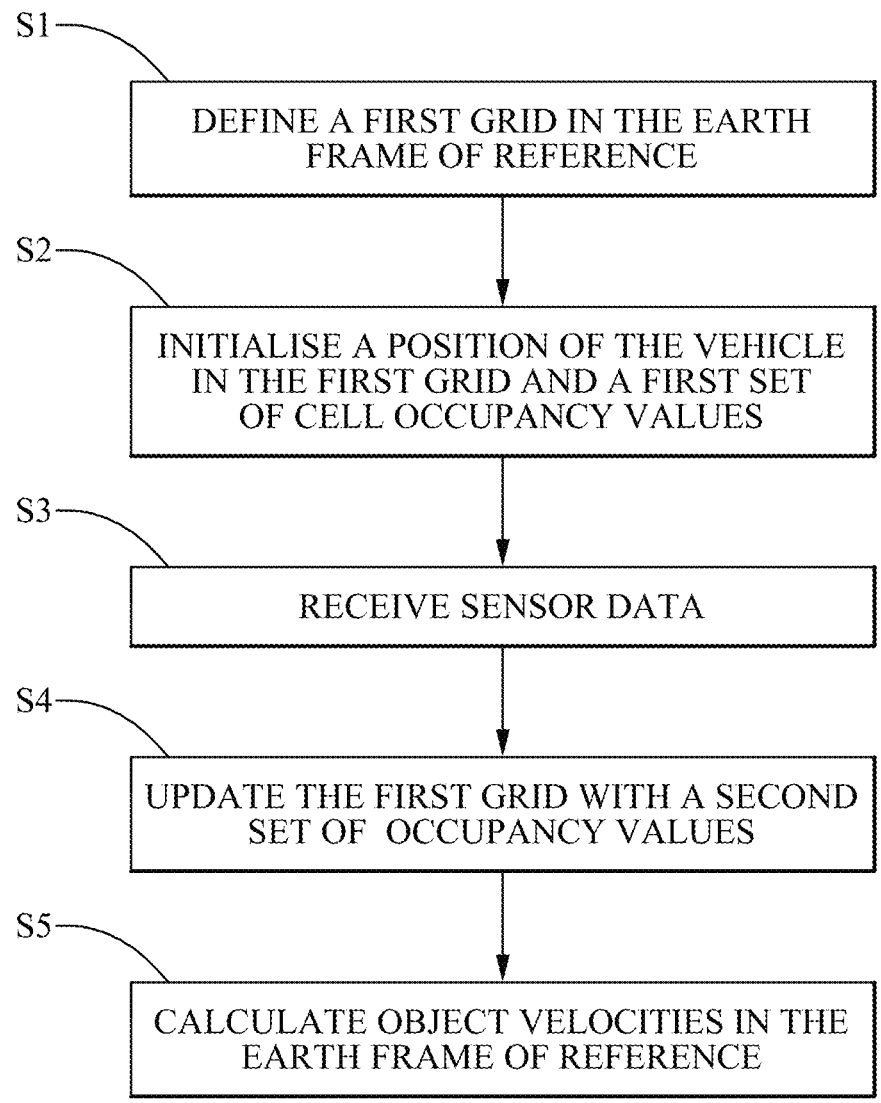
FIG. 4 shows a method for mapping an environment of a vehicle.

FIG. 4 shows a flowchart of a method for mapping an environment of a vehicle, which may be performed, for example, by the device 20 on vehicle 10.

In step S1, a first grid is defined in the earth frame of reference, for example by mapping unit 26. The first grid defines a finite space.

In step S2, a position of the vehicle inside the first grid and a first set of cell occupancy values are both initialized. The initial position of the vehicle inside the first grid may be a predetermined position, preferably a position wherein the area around the vehicle that the vehicle sensors are configured to detect are contained within the first grid. The first set of cell occupancy values may be taken from previous sensor data already available to the device 20 (e.g. generated by mapping unit 26 from sensor data in a previous instance). For example, the occupancy mapping unit 26 may generate an occupancy map in the coordinate system of the first grid, which can be calculated because the position of the vehicle in the first grid is known. If cell occupancy values are not readily available for all or part of the first grid, the cell occupancy values may be initialized to a default value (for example 0.5 is commonly used for a Bayesian grid, but other values may be taken).

Figure 5A:
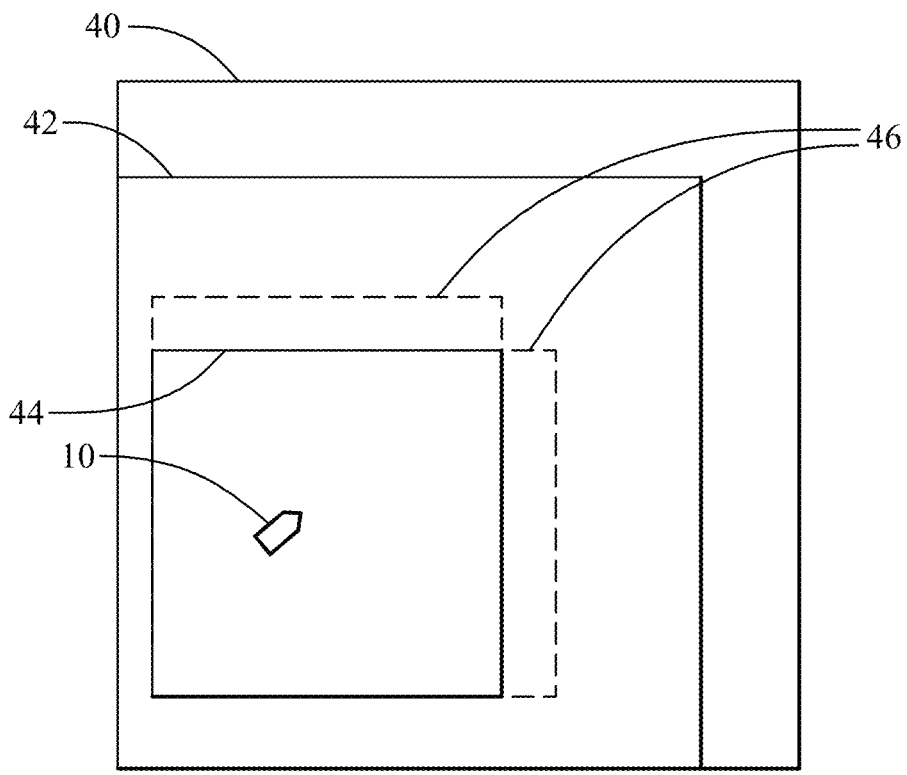
FIGS. 5A to 5E show schematic diagrams of a vehicle in various positions relative to a first grid generating according to one or more methods disclosed herein.

FIG. 5A shows a schematic diagram of the first grid 42 containing the vehicle 10. In the illustrated embodiment, the first grid 42 is smaller than the area 40 which is sensed by the vehicle sensors, although in other embodiments this may not be the case. The occupancy values of the first grid 42 is omitted for simplicity but is analogous to that shown in FIG. 3. In general, the first grid 42 may have a larger, equal, or smaller area than area 40, and preferably the first grid 42 is larger than the area 40.

Figure 5B:
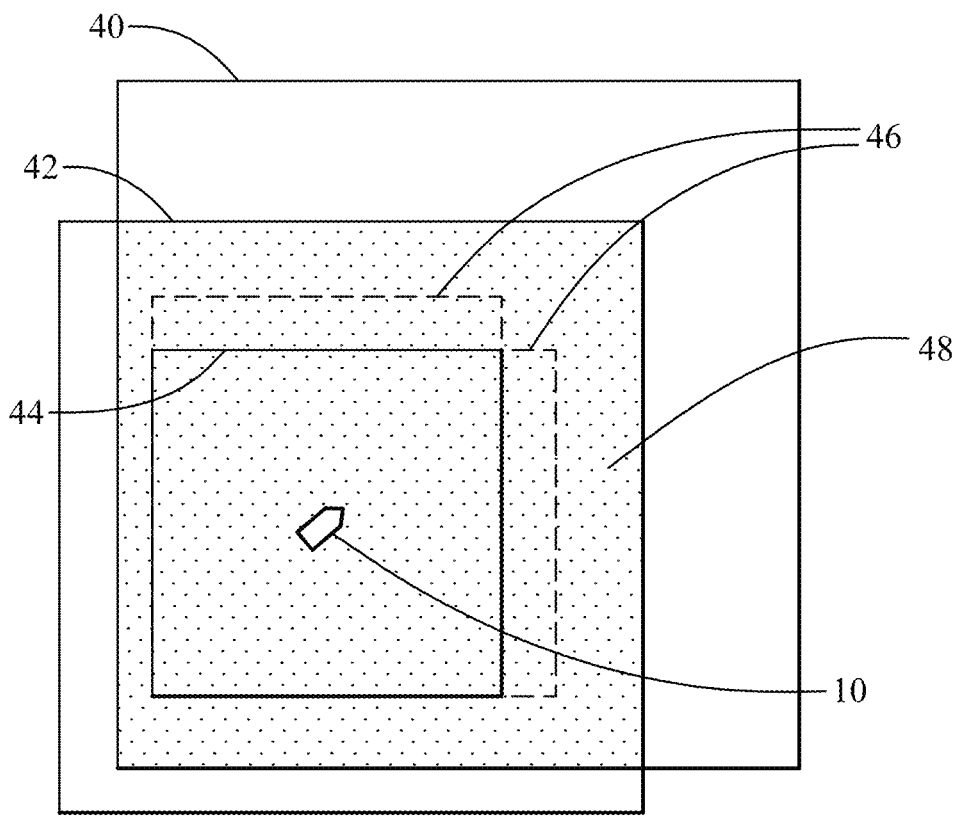

In step S3, sensor data of the surroundings of the vehicle from one or more sensors on the vehicle is received (e.g. from sensors 22 by acquisition unit 24). FIG. 5B shows an exemplary schematic diagram of the vehicle 10 in a second position when the sensor data is received. It is noted that the device 20 may instead include no sensors, and sensor data may be obtained by a separate device on the vehicle and sent to the device 20 for processing according to the method of FIG. 4.

In step S4, the first grid is updated with a second set of occupancy values calculated at least in part from the received sensor data, for example by occupancy mapping unit 26. As shown in FIG. 5B, the area 40 which is sensed by the vehicle moves with the vehicle 10 and so the sensor data is transformed back to the coordinate system of the first grid 42, which remains stationary relative to the earth. It may be that only some occupancy values are updated, as the area 40 which is sensed by the vehicle 10 in the new vehicle position does not cover the entire area of the first grid 42. Therefore, only the occupancy values in the overlapping area 48 of first grid 42 (shown as a patterned area) are updated, whereas the other occupancy values may be unchanged.

The first grid may be updated by calculating a second occupancy grid from the sensor data and updating the first grid with the second set of occupancy values. It is noted that the raw sensor data received by acquisition unit 24 is in the vehicle frame of reference, and the vehicle may have moved from and/or rotated about the initialized vehicle position in the first grid. Therefore, the data may be transformed from the vehicle coordinate system to the first coordinate system. This transformation may be performed on the sensor data by the occupancy mapping unit 26 before the second set of occupancy of values is generated, or an occupancy grid may be generated in the vehicle coordinate system and then transformed to the first coordinate system. The position of the vehicle in the first grid may be tracked, for example, by various vehicle systems, such as a GPS system and speed and turn measuring systems of the vehicle, such that the new position and orientation of the vehicle in relation to the initialized position is tracked by the occupancy mapping unit 26.

The updated occupancy values of the first grid may be based partially on the previous occupancy values of the first grid and partially on the second set of occupancy values. For instance, the first grid may be updated by fusing the previous occupancy evidence values or the occupancy probability values of the first grid in the overlapping area 48 with a second set of occupancy evidence values or occupancy probability values calculated from the sensor data, for example by using a Bayesian fusion method. The new occupancy evidence or probability value in the overlapping area for a given cell may be defined as:

$$p_{new} = \frac{p_{old} \cdot p_{measured}}{(p_{old} \cdot p_{measured}) + (1 - p_{old}) \cdot (1 - p_{measured})}$$

Where $P_{old}$ is the previous occupancy evidence or probability value for the cell, and $P_{measured}$ is the occupancy evidence or probability value for the cell calculated from the new sensor data. It will be appreciated that other fusion methods may be used instead of a Bayesian fusion method, such as maximum policy, sum policy, instant fusion, Linear Opinion Pool, Independent Opinion Pool, Logarithmic Independent Opinion Pool, De Morgan, Dempster Shafer, Dezert-Smarandache and the like. If no new measurements are received for a cell, the cell may take the same occupancy value. It is also noted that the occupancy grid may instead be directly updated with the new occupancy values (i.e. without any data fusion) without departing from the scope of the present disclosure.

In step S5, one or more absolute velocities of one or more objects in the earth frame of reference is generated from the change in cell occupancy values of the first grid (for example by determining unit 28, by comparing the occupancy values of the grid in different frames). As the first grid is provided in the earth frame of reference, the absolute velocities can be obtained directly from the change in occupancy values of the first grid. FIGS. 5A and 5B show a velocity map grid 44 inside which the object velocities may be calculated (although they may be calculated over the entire grid 42, and grid 44 may be any size relative to grid 42). The velocities may be calculated for all of the objects detected in a given area (e.g. 44 or 42).

Steps S2 to S4 may be performed iteratively as new sensor data is received, with the object velocities updating with each iteration based on the change in occupancy values of the first grid. The sensor measurements for each iteration may be separated in time by any time period, for example 0.1 seconds.

The absolute velocities can be calculated using any motion detection algorithm such as any optical flow algorithm, e.g. locally regularized and vectorized algorithms, Lucas-Kanade algorithm or video motion detection and tracking algorithms or the like. Each iteration of the first grid is used as an image input to the motion detection algorithm. The method may include applying an object identification algorithm such as a clustering algorithm to classify groups of occupied cells as objects, and the optical flow algorithm may be applied to each object to estimate the velocity of the object (for example by averaging the velocity of each cell in the object or by an object tracking algorithm).

The above method advantageously allows for a free choice of occupancy grid algorithms and of motion detection algorithms to determine absolute object velocities. In other words, the method updates an occupancy grid in the earth frame of reference using sensor data received in the vehicle's frame of reference, which process automatically disregards static objects in the environment. This allows absolute velocities to be computed directly from the occupancy grid (in contrast, performing a motion detection algorithm in the vehicle frame of reference requires additional complexity to differentiate between moving and static objects, both of which may appear to be moving or stationary in the vehicle frame of reference).

Figure 6A:
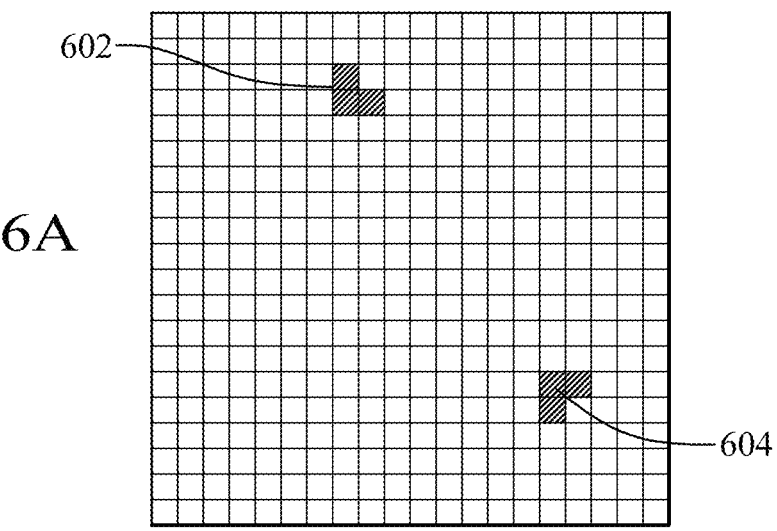
FIGS. 6A to 6C show an exemplary occupancy grid which follows the host vehicle.
Figure 6B:
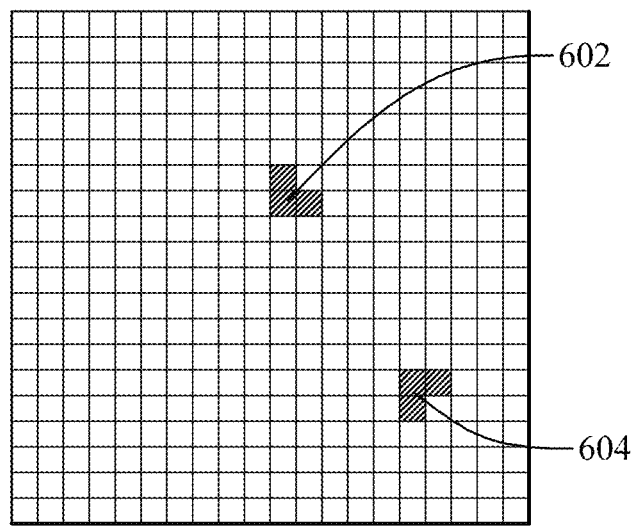
Figure 6C:
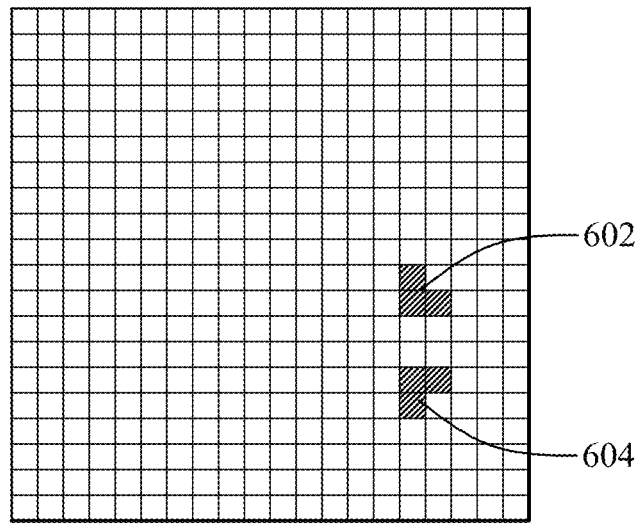
Figure 7A:
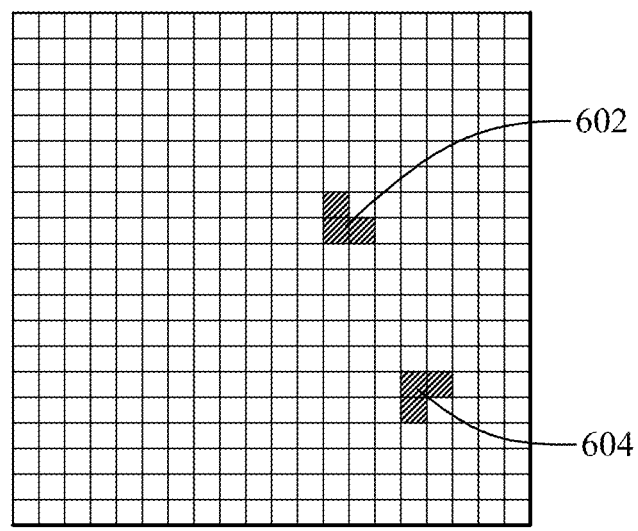
FIGS. 7A to 7C show an exemplary occupancy grid in the earth frame of reference.
Figure 7B:
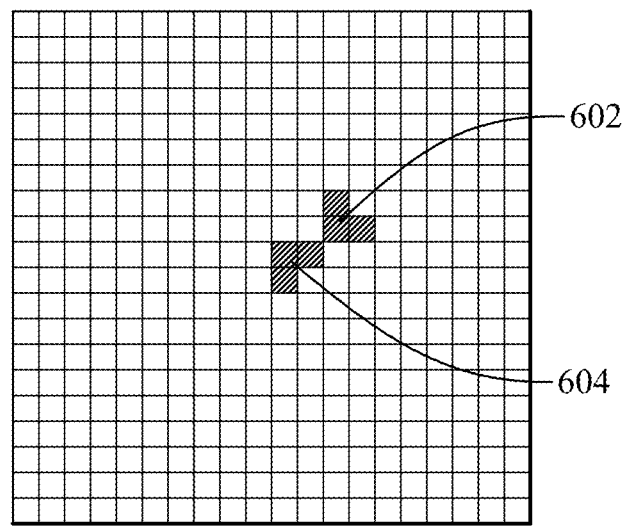
Figure 7C:
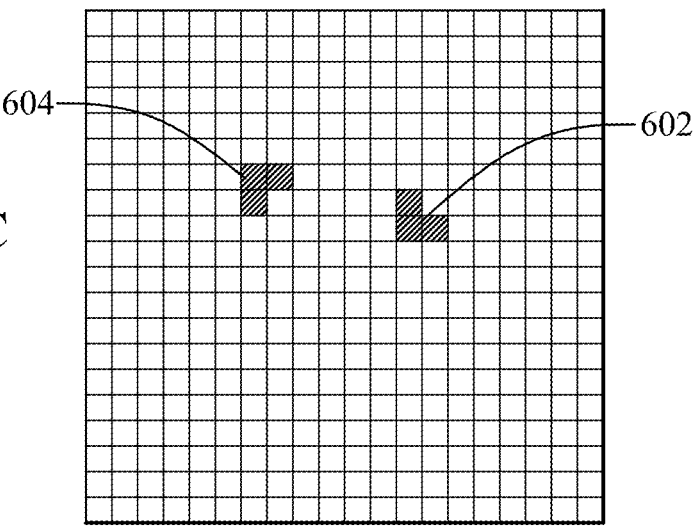

FIGS. 6A to 6C show an occupancy grid which is generated in a vehicle frame of reference at three different time instances. Occupied cells are shown as black and free cells are shown as white. A static object 602 appears to be moving in the occupancy grid relative to the vehicle, whereas a moving object 604 does not appear to be moving as it has a similar velocity to the vehicle. FIGS. 7A to 7C show each respective frame of FIGS. 6A to 6C when transformed to the earth frame of reference (i.e. on the first grid). This can be calculated because the position of the vehicle is initialized in the first grid and the movement of the vehicle from the initial position is tracked. Accordingly, an occupancy grid generated in the vehicle frame of reference can be readily transformed to the earth frame of reference, and the first grid can be updated with the new occupancy data. In FIGS. 7A to 7C, it can be seen that the static object 602 remains static and the moving object 604 moves in the grid. Accordingly, any motion detection algorithm can be performed on the frames shown in FIGS. 7A to 7C to directly detect the speed of an object relative to earth (for example moving object 604). This velocity relative to the earth may be displayed on a display device in the vehicle in the vehicle frame of reference, so that the driver may see which objects in the surroundings are moving in absolute terms.

The method may include a further step of transforming the position coordinates of the one or more absolute velocities to a vehicle frame of reference. As previously discussed, the location and orientation of the vehicle in the first grid is tracked via vehicle systems such as a GPS system, so that the one or more absolute velocities is readily transformable to the vehicle frame of reference (it is noted that the velocities themselves are not transformed to the vehicle frame of reference). Advantageously, this may allow any object tracking system of the vehicle to identify dynamic (non-static) objects in the surroundings of the vehicle. For example, the vehicle may include an advanced driver assistance system configured to predict the movement of dynamic objects (such as other vehicles) in the vicinity of the vehicle, in order to assist the driver in avoiding a collision. The absolute velocities may also be displayed on a display device of the vehicle. The display device may assist the driver of the vehicle in differentiating dynamic objects from static objects in the surroundings of the vehicle.

Figure 5C:
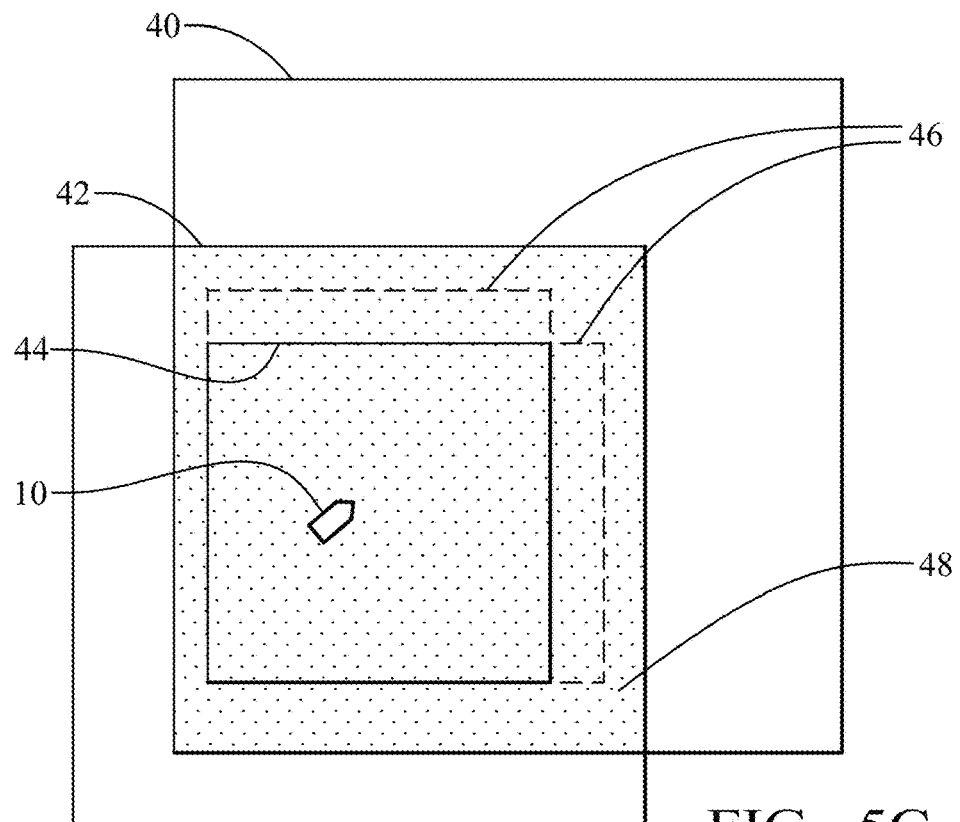

The method may further include generating a third set of cell occupancy values from the sensor data; transforming the third set of cell occupancy values to the first coordinate system; updating the first grid with the third set of occupancy values; and calculating updated object velocities from the change in cell occupancy values of the first grid. In other words, the first grid may be updated iteratively as the vehicle moves around the environment, and the object velocities updated accordingly. FIG. 5C shows a schematic diagram of the vehicle in a third position. The area 40 which is sensed by the vehicle again moves in the vehicle's frame of reference and so the sensor data is transformed back to the coordinate system of the first grid 42, which remains stationary relative to the earth. The area 48 defining the overlap between the area 40 sensed by the vehicle 10 and the first grid 42 is updated with new occupancy values. Accordingly, a motion detection algorithm can be performed on the first grid to find the updated absolute velocities.

Figure 5D:
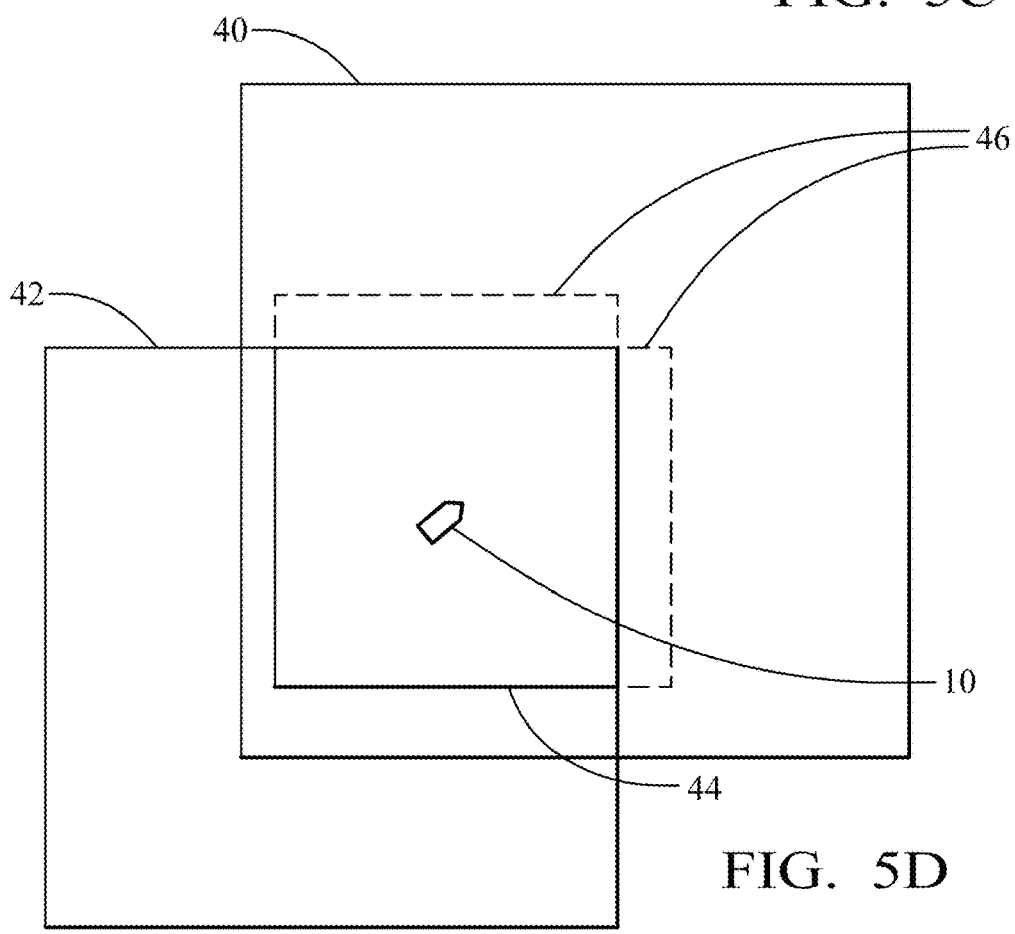

The one or more object velocities are preferably calculated for a velocity map grid 44 velocity map following the position of the vehicle, as shown in FIGS. 5A to 5C (i.e. the position coordinates of the vehicle, or the origin of the VCS, in the velocity map is constant), so that the object velocities are always generated for the same surrounding area of the vehicle. Further, the border of the velocity map grid 44 may be at least a predetermined distance from the border defining the first grid 42. This predetermined distance ensures that the velocity map can reliably calculate object velocities at the edge of the velocity map grid 44, by ensuring buffer zones 46 are contained in the first grid 42 and therefore have occupancy values in each frame. For example, an object which, between frames, moves into velocity map grid 44 from the buffer zones 46 may not be taken account of if the velocity map grid 44 is allowed to abut the first grid 42, as shown in FIG. 5D, because the buffer areas 46 are outside of the first grid 42 and thus do not have occupancy values assigned to them.

When the vehicle 10 moves to a position in which the border of the velocity map grid 44 is at or within a predetermined distance to the border of the first grid 42, the first grid 42 may be repositioned in the earth frame of reference such that the border defining the velocity map grid 44 is more than the predetermined distance from the border defining the first grid 42.

Figure 5E:
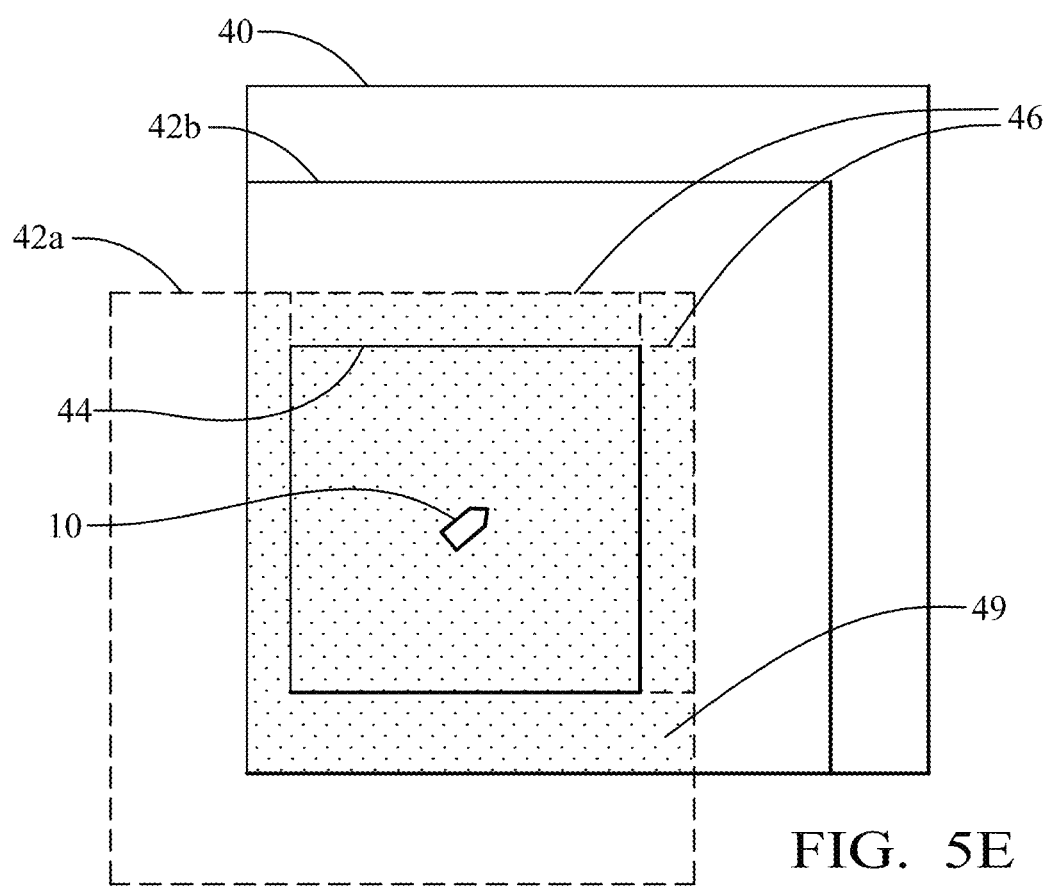

FIG. 5E shows a schematic diagram of the vehicle 10 when the velocity map grid 44 is at a predetermined distance to the first grid in the original position 42a. At this point, the first grid is repositioned to a second position 42b further away from the velocity map grid 44 (i.e. at least partially in the direction of movement of the vehicle 10) so that further movement of the vehicle 10 in the direction is possible without the buffer zones 46 extending outside of the first grid 42. The vehicle position in the repositioned first grid may be initialized so that movement within the first grid is tracked to determine the position of the vehicle at any time. The occupancy values of the first grid in the new position 42b may be initialized with default values, and the cells in the area of overlap between the positions 42a and 42b of the first grid may take the last occupancy values of the corresponding cells in the first position 42a (the overlapping area is indicated by patterned area 49). The object velocities may be updated again via steps S3 to S6, using the re-positioned first grid as the new earth frame of reference. Advantageously, the first grid is repositionable as the vehicle moves in an environment, whilst also providing an earth frame reference from which motion detection algorithms can be applied to determine absolute velocities of objects.

It is noted that in the schematic diagrams shown in FIGS. 5A to 5E, the borders of the velocity map grid 44 are maintained parallel to the borders of the first grid 42, regardless of the orientation of the vehicle 10 (i.e. the orientation of the VCS) relative to the earth frame of reference. This minimized the frequency that the first grid 42 must be shifted to maintain a minimum distance between the border of the velocity map grid 44 and the first grid 42. In other embodiments, the borders of the velocity map grid 44 may not be parallel to the borders of the first grid 42, and the velocity map grid 44 may take any shaped. The velocity map grid 44 may also follow both the position and orientation of the vehicle 10 so that it may both translate and rotate relative to the first grid 42.

The method may include classifying an object as dynamic if the absolute velocity of the object is more than a predetermined threshold value, and otherwise classifying the object as static. Advantageously, classifying objects as such may assist an advanced driver system in identifying which objects are dynamic and static, which is an important distinction in predicting object trajectories for collision avoidance systems.

Figure 8:
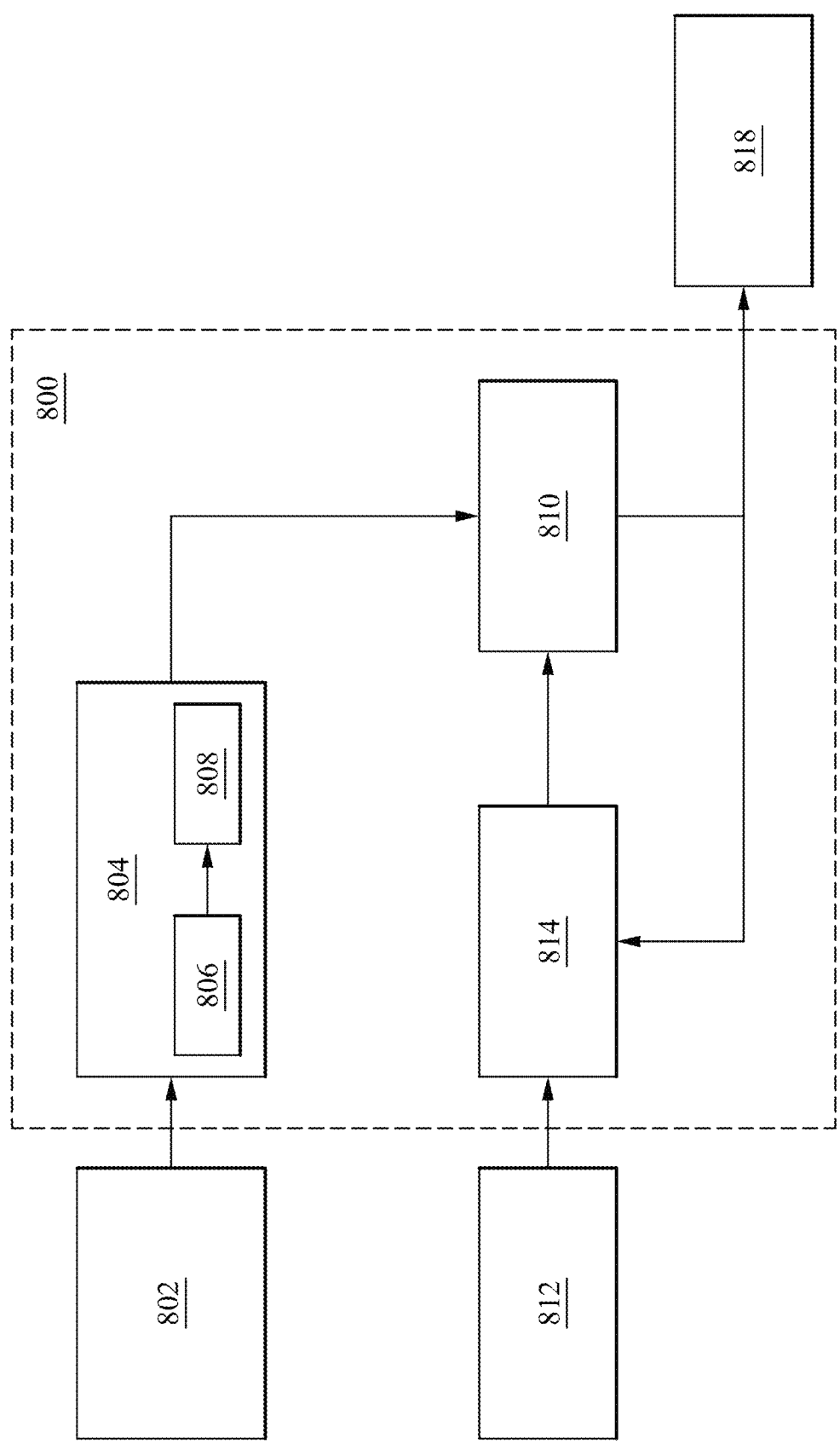
FIG. 8 shows a schematic of a mapping unit.

FIG. 8 shows a schematic of a mapping unit 800 which may be used in some embodiments to implement any of the methods disclosed herein, although any mapping unit which converts sensor measurements into an occupancy grid using any model may be used without departing from the present disclosure.

The mapping unit 800 is configured to receive the detected object or free space measurements 802 from the acquisitioning unit (e.g. acquisitioning unit 24). The mapping unit includes a modelling unit 804 configured to convert detections 802 into occupancy evidence values 808 for each cell, which describes the probability that each cell is the origin of a detection (object and/or free space). The occupancy evidence values 808 are based on the uncertainty in range and azimuth provided by the sensors for each detection.

The mapping unit 800 is further configured to receive a vehicle position measurement 812 and includes a positioning module 814 to calculate the position of the vehicle in the first grid coordinate system.

The mapping unit 800 further includes a fusion module 810 which fuses the calculated occupancy evidence values with the existing occupancy evidence values of the first grid (e.g. from a previous iteration). The new occupancy evidence value for a given cell may be defined as:

$$p_{new} = \frac{p_{old} \cdot p_{measured}}{(p_{old} \cdot p_{measured}) + (1 - p_{old}) \cdot (1 - p_{measured})}$$

Where $P_{old}$ is the previous occupancy evidence value for the cell, and $P_{measured}$ is the occupancy evidence value for the cell calculated from the new sensor data. It will be appreciated that other fusion methods may be used instead of a Bayesian fusion method.

Finally, the mapping unit 800 is configured to generate an updated occupancy grid 818 in the earth frame of reference from the outputted occupancy evidence values. The measurements 802 and 812 may be received continually at multiple time intervals such that the occupancy grid is updated continually.

The determining unit 28 may implement any motion processing algorithm directly on the occupancy grid 818 by taking the grid 818 at different time instances as the input (for example by measuring the motion of detected objects in the grid between time frames) to calculate the object absolute velocities, which may be updated continually.

Whilst the above has been discussed for 2D applications, the same could be applied to 3D applications. In particular, the sensor data could be configured to provide a 3D occupancy grid, and the first grid could be defined as a 3D grid in the earth frame of reference. The 3D location of a vehicle (such as a drone or aircraft) can be initialized and tracked in the first grid using GPS or similar.

Accordingly, the present disclosure provides a method for calculating the absolute velocities of objects in a vehicle's surroundings using simple motion-detection algorithms.

It is noted that in whilst the steps of the methods disclosed herein are given in a particular order, the steps need not be performed in the chronological sequence presented unless a particular step is dependent upon the result of a prior step.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Acquisition unit 24, occupancy mapping unit 26 and determining unit 28 may include suitable software and/or hardware for performing the steps described herein.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nano systems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the embodiments presented herein in any way. It is also to be understood that any procedures recited in the claims need not be performed in the order presented.

While this specification contains many specific embodiment details, these should not be construed as limitations on the scope of any disclosures or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Given the above examples, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements, and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

What is claimed is:

1. A method, the method comprising:
   mapping, with a processor of a vehicle, a vehicle environment by:
   a) defining a first grid in an earth frame of reference having a first coordinate system;
   b) initializing a position of the vehicle in the first grid and a first set of cell occupancy values of the first grid;
   c) receiving sensor data of the surroundings of the vehicle from one or more sensors on the vehicle;
   d) updating the first grid with a second set of occupancy values calculated at least in part from the sensor data;
   e) automatically classifying the one or more objects in the vehicle environment as static objects or dynamic objects based on respective ones of the absolute velocities in the earth frame of reference; and
   f) automatically disregarding the one or more objects classified as the static objects from within the vehicle environment while calculating one or more absolute velocities of one or more objects in the earth frame of reference from the change in cell occupancy values of the first grid such that the absolute velocities are directly computed from the first grid without performing a motion detection algorithm within a vehicle frame of reference; and
   outputting, by the processor, the vehicle environment for use in operating the vehicle in the vehicle environment.

2. The method of claim 1, further comprising:
   transforming position coordinates of the one or more absolute velocities to the vehicle frame of reference subsequent to calculating the one or more absolute velocities directly from the first grid;
   electronically predicting, via an advanced driver assistance system, movement of at least ones of the dynamic objects in a vicinity of the vehicle based on the position coordinates transformed to the vehicle frame of reference; and
   operating, via the advanced driver assistance system, the vehicle based on a result of the predicting.

3. The method of claim 2,
   wherein the one or more absolute velocities in the vehicle frame of reference are displayed on a display device of the vehicle.

4. The method of claim 1,
   wherein the one or more velocities are calculated using an optical flow algorithm.

5. The method of claim 1,
   wherein steps c) to e) are repeated iteratively.

6. The method of claim 1,
   wherein the one or more object velocities are calculated for one or more objects in a velocity map grid containing the vehicle and following the position of the vehicle, and
   wherein a border defining the velocity map grid is at least a predetermined distance from a border defining the first grid.

7. The method of claim 6,
   wherein when the vehicle moves to a position at or within a predetermined distance to the border of the first grid, the first grid is repositioned in the earth frame of reference such that the vehicle is more than the predetermined distance from the border defining the first grid.

8. The method of claim 7,
   wherein the cells of the repositioned first grid are initialized with occupancy values of the overlapping cells in a prior position of the first grid.

9. The method of claim 6,
   wherein the borders of the velocity map grid are parallel to the borders of the first grid.

10. The method of claim 1,
    wherein the second set of occupancy values are calculated at least in part from the first set of occupancy values.

11. The method of claim 10,
    wherein the second set of occupancy values are calculated from a fusion of the first set occupancy values and a third set of occupancy values calculated from the received sensor data.

12. The method of claim 11, wherein the fusion comprises a Bayesian fusion.

13. The method of claim 1, wherein the classifying comprises:
    classifying the one or more objects as the dynamic objects if the absolute velocity of the object is more than a predetermined threshold value, and otherwise classifying the one or more objects as the static objects.

14. A non-transitory computer-readable storage medium comprising instructions that, when executed, cause a processor for a vehicle to:
    map a vehicle environment by:
    a) defining a first grid in an earth frame of reference having a first coordinate system;
    b) initializing a position of the vehicle in the first grid and a first set of cell occupancy values of the first grid;
    c) receiving sensor data of the surroundings of the vehicle from one or more sensors on the vehicle;
    d) updating the first grid with a second set of occupancy values calculated at least in part from the sensor data;
    e) automatically classifying the one or more objects in the vehicle environment as static objects or dynamic objects based on respective ones of the absolute velocities in the earth frame of reference; and
    f) automatically disregarding the one or more objects classified as the static objects from within the vehicle environment while calculating one or more absolute velocities of one or more objects in the earth frame of reference from the change in cell occupancy values of the first grid such that the absolute velocities are directly computed from the first grid without performing a motion detection algorithm within a vehicle frame of reference; and
    output the vehicle environment for use in operating the vehicle in the vehicle environment.

15. The non-transitory computer-readable storage medium of claim 14, wherein the instructions, when executed, further cause the processor to
    transform position coordinates of the one or more absolute velocities to a vehicle frame of reference subsequent to calculating the one or more absolute velocities directly from the first grid;
    electronically predict, via an advanced driver assistance system, movement of at least ones of the dynamic objects in a vicinity of the vehicle based on the position coordinates transformed to the vehicle frame of reference; and operate, via the advanced driver assistance system, the vehicle based on a result of the predicting.

16. The non-transitory computer-readable storage medium of claim 14,
wherein the one or more velocities are calculated using an optical flow algorithm.

17. The non-transitory computer-readable storage medium of claim 14,
wherein steps c) to e) are repeated iteratively.

18. The non-transitory computer-readable storage medium of claim 14,
wherein the one or more object velocities are calculated for one or more objects in a velocity map grid containing the vehicle and following the position of the vehicle, and
wherein a border defining the velocity map grid is at least a predetermined distance from a border defining the first grid.

19. The non-transitory computer-readable storage medium of claim 14, wherein the classifying comprises:
classifying the one or more objects as the dynamic objects if the absolute velocity of the object is more than a predetermined threshold value, and otherwise classifying the one or more objects as the static objects.

20. A system comprising:
an object tracking system for a vehicle, the object tracking system comprising a processor configured to:
map a vehicle environment by:
a) defining a first grid in an earth frame of reference having a first coordinate system;
b) initializing a position of the vehicle in the first grid and a first set of cell occupancy values of the first grid;
c) receiving sensor data of the surroundings of the vehicle from one or more sensors on the vehicle;
d) updating the first grid with a second set of occupancy values calculated at least in part from the sensor data;
e) automatically classifying the one or more objects in the vehicle environment as static objects or dynamic objects based on respective ones of the absolute velocities in the earth frame of reference; and
f) automatically disregarding the one or more objects classified as the static objects from within the vehicle environment while calculating one or more absolute velocities of one or more objects in the earth frame of reference from the change in cell occupancy values of the first grid such that the absolute velocities are directly computed from the first grid without performing a motion detection algorithm within a vehicle frame of reference; and
output the vehicle environment for use in operating the vehicle in the vehicle environment.

\* \* \* \* \*